Nov. 28, 1967  R. C. STRAUSS  3,354,743
VEHICLE DRIVING CONTROLS
Original Filed Dec. 3, 1959

INVENTOR.
RAYMOND C. STRAUSS

United States Patent Office 3,354,743
Patented Nov. 28, 1967

3,354,743
VEHICLE DRIVING CONTROLS
Raymond C. Strauss, 301 W. Lenawee St.,
Lansing, Mich. 48914
Original application Dec. 3, 1959, Ser. No. 857,221.
Divided and this application Sept. 30, 1963, Ser.
No. 323,187
4 Claims. (Cl. 74—560)

This application is a divisional application of Ser. No. 857,221, filed Dec. 3, 1959, which in turn is a continuation in part of Ser. No. 350,186, filed Apr. 21, 1953 and now abandoned.

The present invention relates generally to motor vehicle controls wherein upon the application of the vehicle brakes to retard the forward motion of the vehicle the carburetor is automatically actuated to an idling position and maintained in the latter condition independently of the position of the manual or foot-operated accelerator during the period that the brakes remain applied and more particularly relates to improvements in controls of this general character which are disclosed and claimed in my applications: Serial No. 553,274, filed Sept. 8, 1944, issued as Patent 2,642,166 June 16,1953; Serial No. 609,-796, filed Aug. 9, 1945 and now abandoned; and Serial No. 639,245, filed Jan. 5, 1946 and now abandoned.

One of the primary objects of the present invention is to provide a brake which can be applied with the left foot of the operator and which is arranged in the same plane or on the same level as the accelerator, the novel arrangement hereof being of such a character that the accelerator is effectively disconnected from the throttle whenever the brake is applied and effectively reconnected to the throttle whenever the brake is released it being possible, by virtue of the foregoing arrangement, for the operator to rest both feet upon the controls at all times thereby eliminating the necessity of shifting of the feet between the brake and accelerator as heretofore required in conventional arrangements.

Another object of this invention is to provide a novel type of treadle especially suited for left foot braking which includes a heel rest extending laterally from the body of the treadle and arranged parallel to the vehicle floor whereby the heel of the operator's foot may be adjusted inclinably thereon to the most comfortable ankle position, the treadle being adapted for use as either a simple pivoting treadle brake, or in combination with either and underlying thrust brake or a toe-type thrust brake.

A further object is to provide a novel foot treadle having a laterally extending heel rest together with a bearing surface for the ball of the foot, the latter surface remaining, during treadle action, in the same plane as that which it occupies in a rest position whereby the operator's ankle flexes through a very limited range thereby providing the operator's foot with the maximum of sure-footed comfort and at the same time minimizing the fatigue otherwise imposed on the operator's foot with conventional pedals.

A further object is to provide a novel foot treadle having a laterally extending heel rest together with a toe portion bearing surface for the ball of the driver's foot, the latter surface travelling downward during the treadle braking action in an arcuate direction opposite to that of the upper edge of said treadle portion, whereby in the downward movement of the ball of the foot the toe portion may be followed arcuately to sustain the force of the applied pressure, said toe portion and heel treadle portion linked together for such movement.

A further object is to provide pivoting points for my brake actuators perpendicular to the floorboards for crosswise support locking as well as crosswise tilting for feeding of gas therefrom when said pivoting top is used as a single pedal control and when employing both the foot support device and the accelerator disconnect unit.

Another object is to provide a heel rest separately mounted on the vehicle floor for detent engagement with the released brake pedal whereby relaxed heel weight supports toe weight against downward movement of the brake pedal.

Another object is to provide in combination with my novel forms of brake control means for performing other operations than braking during the initial movement of the controls preceding the braking action or coincident therewith, such operations including: disconnect of the accelerator as well as reconnect of the same, release of a foot support.

Another object is to provide an accelerator with a laterally rockable top which may be carried on a brake pedal to provide single pedal control, the rocking action not only locking the accelerator for downward thrust as a brake but also cutting off connection of the accelerator with the carburetor, and releasing foot supporting means which normally bears the weight of the operator's foot when using the control as an accelerator.

Figure 1:
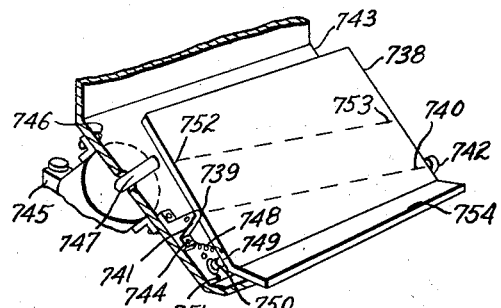
FIGURE 1 is a perspective view of a diagonally pivoted treadle brake for operation of a power booster brake shown therewith.

Referring now to the drawings for a more detailed description of the present invention, FIGURE 1 shows a brake treadle 738 pivoted at 739 and 740 on stanchion 741 and 742 which are secured to floorboard 743 by means of bolts 744. An integral master cylinder-power booster brake assembly 745 is secured by bolts 744 and 746 to the underside of floorboard 743 in its inclined portion. Brake control shaft 747, is shown to be uncontacted by the underside of treadle 740, pullback spring 748 having rotated treadle 738 clockwise to rest below pivot points 739 and 740 against protruding switch button 749. Button 749 projects through opening 750 in floorboard 743 and its assembly (not shown) is secured to the bottom of floorboard 743 in its inclined portion through bolts 751. With treadle 738 resting against button 749 the switch is located in an "off" position for control in this instance, of one of my electrically energized forms of the accelerator disconnect. With the counterclockwise rotation of treadle 738 through pressure by the upper portion of the operator's foot the space between the upper end of control shaft 747 and the underside of treadle 73 will be closed, and a compression ring within the switc assembly will push button 749 upwardly to shift th switch to an "on" position thereby operating the acceler ator disconnect unit before braking action begins.

Treadle 738 carries a laterally extending heel rest 75 so that the driver may completely relax his foot and ad just his heel to any comfortable ankle position. Since th ankle location of a long foot will fall closer to the pivc point 739 than a short foot, and since the released treadle here uncontacted and unresisted by the brake shaft is critically sensitive to the counterbalancing heel weight of the relaxed foot, stanchion 742 with pivotal point 740 is positioned closer to the heel rest portion 754 than stanchion 741. With this arrangement the driver may shift his foot laterally to find the location at which his foot weight will effect the proper heel weight counterbalance, it being obvious that the preponderance of relaxed foot weight above the line 739–740 would have the effect of disconnect action rather than the preservation of acceleration connection to the carburetor.

Power booster brakes as now used on many passenger cars respond to very light pedal pressures. As a result, if a power booster brake works satisfactorily for a small foot it will, in many cases, be found too sensitive for a large foot the added weight thereof being sufficient to cause overbraking. Where treadle 738 with its diagonally located pivots 739–740 is used, the driver may shift his foot laterally not only for a comfortable counterbalance point but for better control of the braking leverage. Dotted line 752–753 shows the point at which the ball of the foot should rest to duplicate the leverage directly above brake shaft 747. The driver with a small foot using treadle 738 will find braking control most satisfactory if he rides the brake near pivot point 740, while the driver with the longer foot, who would otherwise overbrake, will find braking control most satisfactory near pivot point 739. Furthermore, in slippery weather the driver may move his foot closer to pivot point 739 than normally in order to achieve a "hard pedal" and reduce the danger of locked wheels through overbraking.

Figure 2:
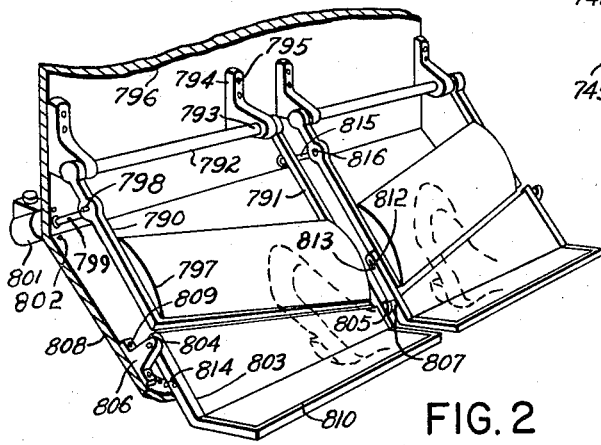
FIGURE 2 is a perspective view of a pedal-treadle brake along with a similar pedal-treadle construction for the accelerator, the operator's positioned feet being shown in perspective, broken lines.

In FIGURE 2 is shown a pendulum-toe, treadle-heel type of brake actuator which gives the driver not only direct downward thrust movement when braking but also the opportunity to straighten and stiffen his leg for intensified pressure since platform 797 in moving arcuately away from heel rest 803 permits the foot to follow around the arc of movement to sustain the thrusting force throughout the downward movement.

In the initial downward movement of platform 797 the elongated eye 798 will move downwardly to engage the upper end of pushrod 799 and in so doing will give an electric switch or valve control (not shown) an opportunity to operate one of my accelerator disconnect units. Continued downward movement will then start to move the master cylinder plunger into master cylinder housing 801 for brake setting. With the downward movement of platform 797 the heel rest 803 will rotate diagonally thereto in a counterclockwise direction and pin 813 attached to arm 791 will therefore slide endwardly and partially out of elongated eye 812 while traversing lengthwardly the elongated cut thereof.

Inasmuch as platform 797 is pendulum suspended, a long foot in falling upon 797 will project upwardly closer to the point of fulcrum, namely shaft 792, than a short foot, and therefore the long foot will have less leverage upon platform 797 than the short foot with the result that the length of the foot automatically adjusts the pressuring force to the brake shaft so that substantially uniform braking pressure is developed by different drivers and tendencies for overbraking are minimized.

Where several drivers operate the same vehicle from time to time, each driver having a different shoe length, the accelerator will be found too hard or too soft for one or more. With the counterbalancing heel rest and pendulum toe arrangement applied to the accelerator, as it is in FIGURE 2, this complaint can be eliminated. The pullback spring (not shown) of the accelerator linkage may be adjusted to accommodate the smallest operator's foot, in which case the platform 797 would be ridden adjacent arm 791. Longer feet would move further away from 791 for proper counterbalance on the heel rest. Since the longer feet would fall closer to the point of fulcrum, their leverage would be less than that of the small foot so that the adjusted pullback spring would offer the same resistance to the longer feet as it offers to the small feet.

Figure 3:
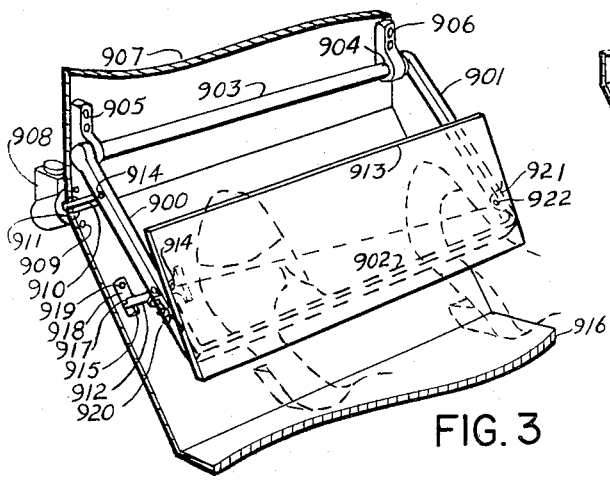
FIGURE 3 is a perspective view of a pendulum suspended, foot supporting, diagonally pivoted, tilt top brake pedal with two sizes of left feet resting thereon, the support technique being illustrated.

FIGURE 3 shows the application of the diagonally tiltable top to a pendulum suspended brake arm wherein the braking foot rides the brake in released position and the heel of the braking foot rests on the floor. Here arms 900 and 901 are welded at their lower ends to cross brace 902 and at their upper ends to shaft 903 after shaft 903 has been passed through openings 904 of brackets 905 which are held by bolts 906 to the firewall 907 of a vehicle. A master cylinder assembly 908 is secured to the opposite side of firewall 907 by bolts 909, pushrod 910 projecting through opening 911 for contact with the customary master cylinder plunger within assembly 908. Depending arm 912 is welded to the underside of tiltable brake top 913 to pivot at 914 on cooperating arm 900. The lower end of depending arm 912 passes through opening 915 of floorboard 916 to engage through a detent 917 on its lower front edge a cleat 918 secured to the forward end of opening 915 by bolt 919 so that when spring 920 between one arm 900 and top 913 is so contacted, assisted by the relaxed weight of the driver's foot, downward pressure on arms 900 and 901 will be resisted. The opposite end of tiltable top 913 pivots at ear 921 on the lower end of arm 901, ear 921 being pivoted at 922, a point nearer cross brace 902 than pivot point 914 on arm 900 so that top 913 tilts diagonally to shaft 903.

With this arrangement in which the heel rests on the floor, the line of diagonal pivoting 914–922 is located to fall farther ahead of the ankle than where there is a rotatable heel rest, as in FIGURES 1 and 2, so that the tilting point will be located just below the ball of the foot and very slight pressure through the ball of the foot will cause the tilting to occur, releasing the foot support, operating the disconnect unit, and the like. It will be seen that a woman's small foot will therefore be placed nearer pivot point 122, for example, then a man's larger foot (shown in broken lines) in order to locate the position at which the tilting top can be operated comfortably.

Figure 4:
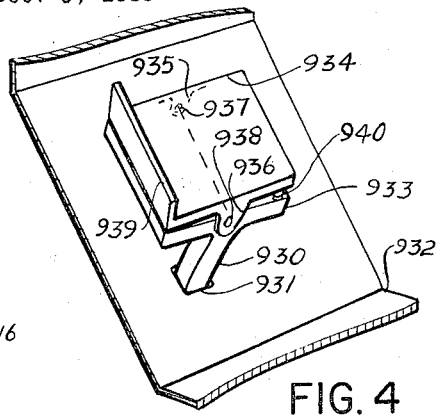
FIGURE 4 is a perspective view of a tilt top brake pedal pivoted perpendicularly to the lower portion of the floorboard of the vehicle, no support means being illustrated.

In FIGURE 4 there is shown a brake arm 930 projecting through opening 931 of the inclined portion of floorboard 932. A superimposed tiltable top 934 pivots on the platform top 933 of arm 930 through ears 935 and 936 at points 937 and 938 so that the tilting action will be vertical to the lower level of the floorboard 932, rather than parallel or diagonal thereto or at other positions therebetween. As in the other forms the tiltable top may be used to effect and remove a support for the driver's relaxed foot when riding thereon, operate an accelerator disconnect or the like. Outboard ledge 939 serves to hold the driver's relaxed foot when riding top 934, and spring 940 disposed between the underside of top 934 and platform 933 assists in holding the top 934 in position shown.

With this arrangement advantage is taken of the fact that drivers usually relax outboard toward the driver's door and armrest so that relaxed foot weight may well be employed to hold brake top 934 in an untilted outboard position, this action serving to lock one of my foot supporting devices in a locking position.

Figure 5:
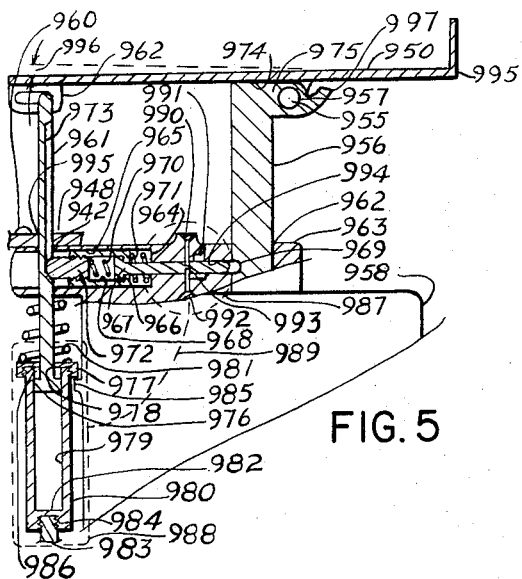
FIGURE 5 is a side elevation view in section of a single pedal, accelerator-brake control employing the perpendicular pivots of FIGURE 4 and being shown in combination with a power booster braking unit.
Figure 6:
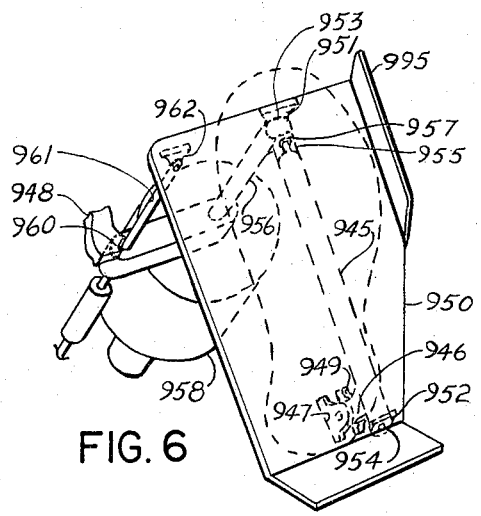
FIGURE 6 is a perspective view of FIGURE 5.

In FIGURES 5 and 6 of this application the vertical pivot points are incorporated in a double top treadle operating as a single pedal control for both the accelerator and brake. With this arrangement the right foot alone is employed for accelerating and braking, and the left foot is not used. As shown in FIGURE 6, shaft 945, hinged at its heel through ear 946 cooperating with brackets 947 attached to the floorboard 948 by bolts 949, is used as a treadle platform base while braking. Top 950 is vertically hinged at the ends of shaft 945 through depending ears 951 and 952 at points 953 and 954. The upper end of shaft 945 is reduced in diameter to form shouldered section 955 over which rides the upper end of brake shaft 956 by way of opening 957. Opening 957 is conically enlarged toward its lower face to provide a pitched bearing area so that shaft 945 may move arcuately downward about ears 947 in a treadle movement for brake setting.

Brake shaft 956 enters and controls at its lower end master cylinder-power booster brake assembly 958 which is attached to the underside of the inclined portion of floorboard 948, a fragment of which is shown, by bolts 960. An accelrator shaft 961 pivots at its right angled upper end in ear 962, welded to the underside of top 950, in elongated opening 963 thereof. Accelerator shaft 961 passes near its lower end through bearing opening 995 of housing block 963 which is raised upon and formed integrally with the upper end of power brake assembly 958. Housing block 963 is drilled from its outer end with bearing opening 964 to intersect brake shaft bearing 962 at the axial center of the assembly, smaller bearing opening 966 connecting to opening 964 with center opening 962.

A locking block assembly slides into bearing opening 964, its cylindrical housing 965 carrying at its own axial center the large bore 968 for T-head finger 967 which projects through small axial bore 966 in housing 965 to ride in bearing opening 994 connecting with brake shaft bearing opening 962 for registry with detent 969 cut into the side of brake shaft 956. Spring 970 is confined behind finger 967 within bore 968 and spring 971 is confined between the end housing 965 and the inner end of large bearing opening 964. A finger 972 threads at one end into housing 965 and at the opposite end engages cut 973 in accelerator shaft 961, said elongated cut 973 spanning a section of shaft 961 between top 950 and above the finger 972, as shown in FIGURE 5, when top 950 rests in an untilted position on the flat surface 974 formed by the top of brake shaft 956 where ear 975 is welded thereto.

At the lower end of accelerator shaft 961 there is formed T-head 976 as an integral part of shaft 961. Cap 977, apertured at the center with the opening 978, is passed thereover so that T-head 976 rides in cylindrical area 979 of cylinder 980, cap 977 threading to the upper end of cylinder 980. Spring 981 is interposed between the projecting end of housing block 963 and cap 977. Area 979 terminates downwardly in a blind end 982 and accelerator linkage 983 threads into opening 984 to complete at its opposite end, not shown, the connection with the carburetor of the vehicle. A ledge 985 projects from brake booster assembly 958 to serve as a rest for cap 977 against the further expansion of spring 981, and a side rest 995 for the driver's foot flanks the inboard edge of top 950. Stop 997 on ear 975 limits the clockwise rotation of top 950 for acceleration of the motor.

In the operation of the mechanism so far described the driver's right foot will ride top 950 at all times in a position, as shown, in broken lines, approximately balanced over shaft 945. If now, he tilts his foot toward side rest 995, top 950 will begin to rotate clockwise. Upward movement of accelerator shaft 961 will result, so that T-head 976 in cylindrical area 979 will move through play space 986 for T-head 976 to contact the underside of cap 977. In this initial movement finger 972 will be ejected from cut 973, collapsing spring 971, and finger 967, impelled by spring 970, will move endwardly to seat in detent 969, so that brake shaft 956 becomes substantially resisted against further downward pressure as top 950 is turned further clockwise. Continued clockwise movement now causes cylinder 980 and linkage 983 to be lifted and spring 981 to be compressed, linkage 983 opening the carburetor throttle valve in the customary manner to increase the speed of the vehicle.

To apply the brake the driver now releases the clockwise pressure to permit expansion of spring 981 so that finger 972 is again driven into contact with cut 973 through expansion of spring 971 and finger 967 is withdrawn from engagement with detent 969. With direct downward pressure now bearing on end 974 engaged with the underside of top 950 the brake shaft 956 will move downwardly freely, to operate the power booster brake assembly 958 for a vehicle stop.

As brake shaft 956 moves downwardly, accelerator shaft 961 will also be moved downwardly causing T-head 976 to slide toward blind end 982 of cylinder 980, the accelerator linkage at 983 remaining in a carburetor closed position while this braking action continues. Even though brake top 950 is tilted crosswardly in this braking position, no gas will be fed to the carburetor since T-head 976 will not abut cap 977.

If now the brake top is released and again tilted clockwise, finger 967 will again engage detent 969 to support brake shaft 956, and T-head 976 will lift cap 977 to move linkage 986 upwardly for throttle opening action. In this position, if the driver now jams straight downwardly while still accelerating in order to set the brakes, as in an emergency, heavy pressure on shaft 956 will immediately eject finger 967 from engagement with detent 969 by compressing spring 970. Shaft 956 then will be freed for unresisted movement downwardly, and accelerator shaft 961, in also moving downwardly, will permit spring 981 to expand and linkage 983 to drop to close the carburetor throttle valve. In this jamming movement the accelerator disconnect here shown moves progressively to close the carburetor; that is, as the brake shaft 956 descends, the accelerator closes in direct ratio to the movement of shaft 956.

If now one of my other forms of an accelerator disconnect device is here substituted, requiring switch or valve means to initiate the action, the disconnect action will be instantaneous and complete at the start of the descent of brake shaft 956. The substituted parts would be inserted in dotted line encircled area 987, box 988 and connection 989 therebetween. Encircled area 987 would then have on one face of housing block 963 threaded to port 990 connecting to a source of vacuum assuming the use of one of my vacuum operated units said port connecting with bearing opening 994. Adjacent thereto an air port 991 would likewise connect the sur face of block 963 with bearing opening 994. Directly opposite these two ports a threaded port 992 would communicate the opposite face of block 963 with bearing opening 994. A connection 989, such as a flexible hose would join port 992 with one of my disconnect unit located in enclosure 988. Finger 967 would then carry valve cut 993 at one point intermediate of its length so that with finger 967 engaged with detent 969 air at atmospheric pressure would be conducted through 989 to unit 988 to maintain linkage connection to the carburetor With finger 967 ejected from detent 969 vacuum would be conducted through 989 to unit 988 to break the linkage connection.

The play space 986 above T-head 976 in cylindrical area 979, as shown in the arrow-indicated, dotted-line space 996 above top 950 appears after cap 977 has seated against ledge 985 in the counterclockwise movement o top 950. In this slack space movement brake shaft 956 becomes unsupported and the disconnect action occurs This movement corresponds to the initial brake pedal movement of the other forms of my invention herein disclosed where the brake is separate from the accelerator this movement being equivalent to the tilt top movement of a double top brake or the initial downward move ment of a single top brake, so that with the start of th braking movement the brake support has been remove and the accelerator has been disconnected.

Although several embodiments of the present invention have been illustrated and described in detail, it is express ly understood that the invention is not limited thereto Various changes may be made in the design and arrange ments of the parts without departing from the spirit an scope of the invention as will be understood by thos skilled in the art.

What is claimed is:
1. Within a vehicle driving compartment containing foot operated brake control and a floorboard compose f a lower horizontal portion joined at one edge to an inclined portion, a brake pedal in said compartment for engaging said brake control, a pivot arrangement connecting said brake pedal to a foot contactible surface overlying pedal, said pivot arrangement establishing an axis about which said surface tilts in either of two opposite directions, the locations of said pivot arrangement providing numerous possible positions for the axis between a first position parallel to said horizontal portion of the floorboard and a last position perpendicular to said horizontal portion in a plane substantially parallel to the brake pedal, said surface being so positioned on said pivot arrangement that when the operator's foot is at rest on said surface the weight of the foot will urge the surface to tilt about the axis in one direction, and when the foot is applying pressure the force of the foot will urge the surface to tilt about the axis in the opposite direction, and means cooperating with said surface to support said pedal and foot in a brake released position when said surface is tilted in one direction and to render said pedal and foot unsupported when said surface is tilted in the opposite direction.

2. In combination with a vehicle braking system a foot operable braking surface tiltably mounted by way of pivots on a brake arm, a spring between said surface and arm to urge said surface to tilt in one direction to a first position about an axis established by said pivots, and said surface responsive to pressure by the operator's foot to overcome said spring and tilt said surface in the opposite direction over said axis to a second position, said brake arm to alternately abut said surface in its first and second positions, and means operating to hold said brake arm from operating said system when said surface is tilted to said first position, and to free said brake arm when said surface is tilted to said second position.

3. The invention of claim 2 and an upstanding shoulder attached to one side of said surface so that when the operator's foot is relaxed on said surface the foot will be curbed at its outside edge by said shoulder, and the preponderant portion of the weight of the operator's foot will assist the spring to tilt the surface to said first position.

4. In a control system for a powerized vehicle having a foot operated accelerator for operating the powerizing unit and a foot operated brake pedal for operating a braking system, a foot contacting braking surface tiltable about an axis through hinge connections on said brake pedal in a first and second direction opposite to each other, a first means cooperating with said surface to support said brake pedal in a non-operating position when said surface is tilted in said first direction, and to render said pedal unsupported for downward movement and operation of said braking system when said surface is tilted in said second direction, and a second means cooperating with said braking system and said accelerator to render the accelerator operatively effective when said braking surface is tilted in said first direction and ineffective when tilted said second direction, said hinge connections located under said braking surface in a position on said brake pedal such that when the operator's foot is relaxed on said surface, the surface and the operator's ankle will rotate at right angles to the length of the operator's foot about said axis in said first direction, and when the operator's foot is pressured downwardly, the surface and the foot will rotate at right angles to the operator's foot about the axis in said second direction to render said accelerator ineffective and said pedal unsupported for downward movement to operate said braking system.

References Cited
UNITED STATES PATENTS

| | | | |
|---|---|---|---|
| 630,281 | 8/1899 | Alden | 74—539 X |
| 655,053 | 7/1900 | Burke | 74—561 |
| 1,476,578 | 12/1923 | Ballak | 74—512 |
| 1,898,557 | 2/1933 | McCune | 74—560 |
| 1,919,968 | 7/1933 | Trabold | 74—560 |
| 1,940,081 | 12/1933 | Felies | 192—3 |
| 1,975,521 | 10/1934 | Staude | 200—59 |
| 2,068,962 | 1/1937 | Sanford | 74—560 X |
| 2,146,491 | 2/1939 | Tudor | 188—152.44 |
| 2,199,963 | 5/1940 | Romburger | 74—560 |
| 2,253,305 | 8/1941 | Porter | 188—152.44 |
| 2,276,028 | 3/1942 | Dick | 200—59 |
| 2,311,120 | 2/1943 | Mossinghoff | 192—3 |
| 2,423,006 | 6/1947 | Chambers et al. | 192—3 |
| 2,455,985 | 12/1948 | Elliott | 60—54.5 |
| 2,458,803 | 6/1949 | Stelzer | 60—54.5 |
| 2,542,410 | 2/1951 | Hedges | 74—560 X |
| 2,628,507 | 2/1953 | Juergens | 74—562 X |
| 2,634,625 | 4/1953 | Mahardy | 74—539 |

FRED C. MATTERN, Jr., *Primary Examiner.*

DAVID J. WILLIAMOWSKY, MILTON KAUFMAN, *Examiners.*

C. F. GREEN, *Assistant Examiners.*